Nov. 26, 1957     H. W. SCHAFFER     2,814,368
GEAR CASE SEAL
Filed July 31, 1953     2 Sheets-Sheet 2
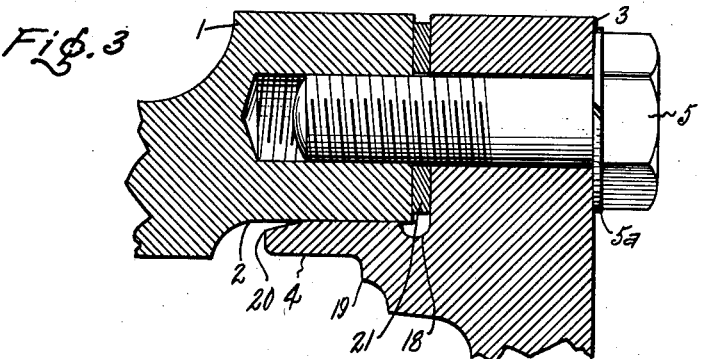
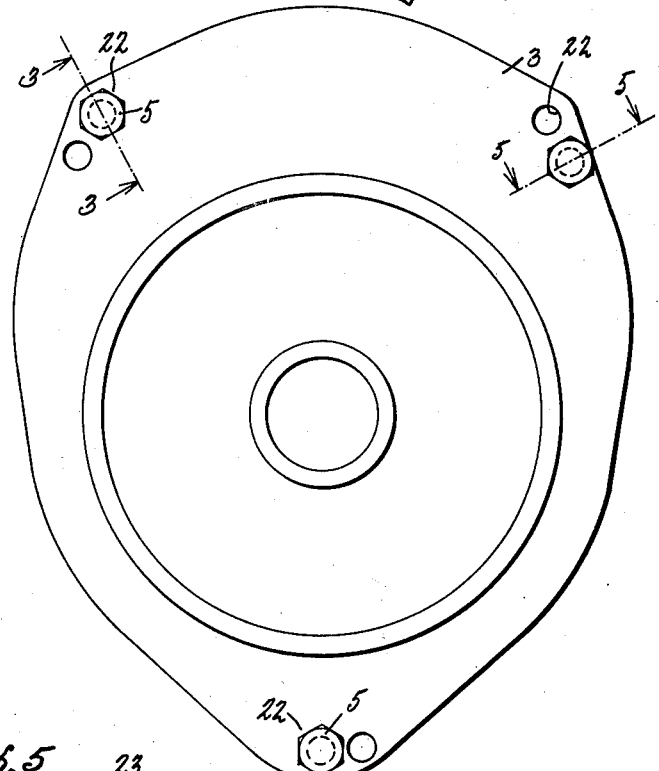
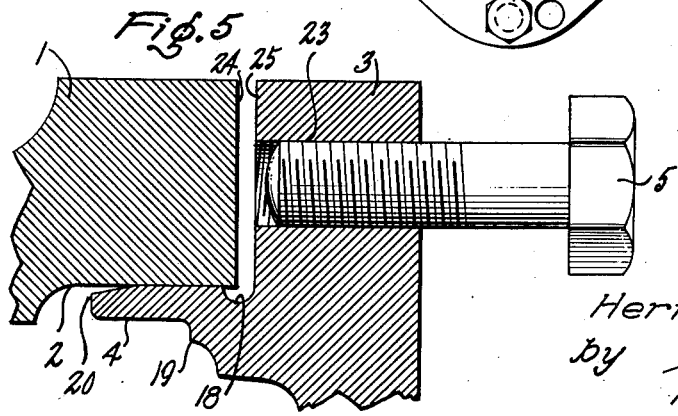
Inventor
Herman W. Schaffer
by
His Attorney United States Patent Office 2,814,368
Patented Nov. 26, 1957

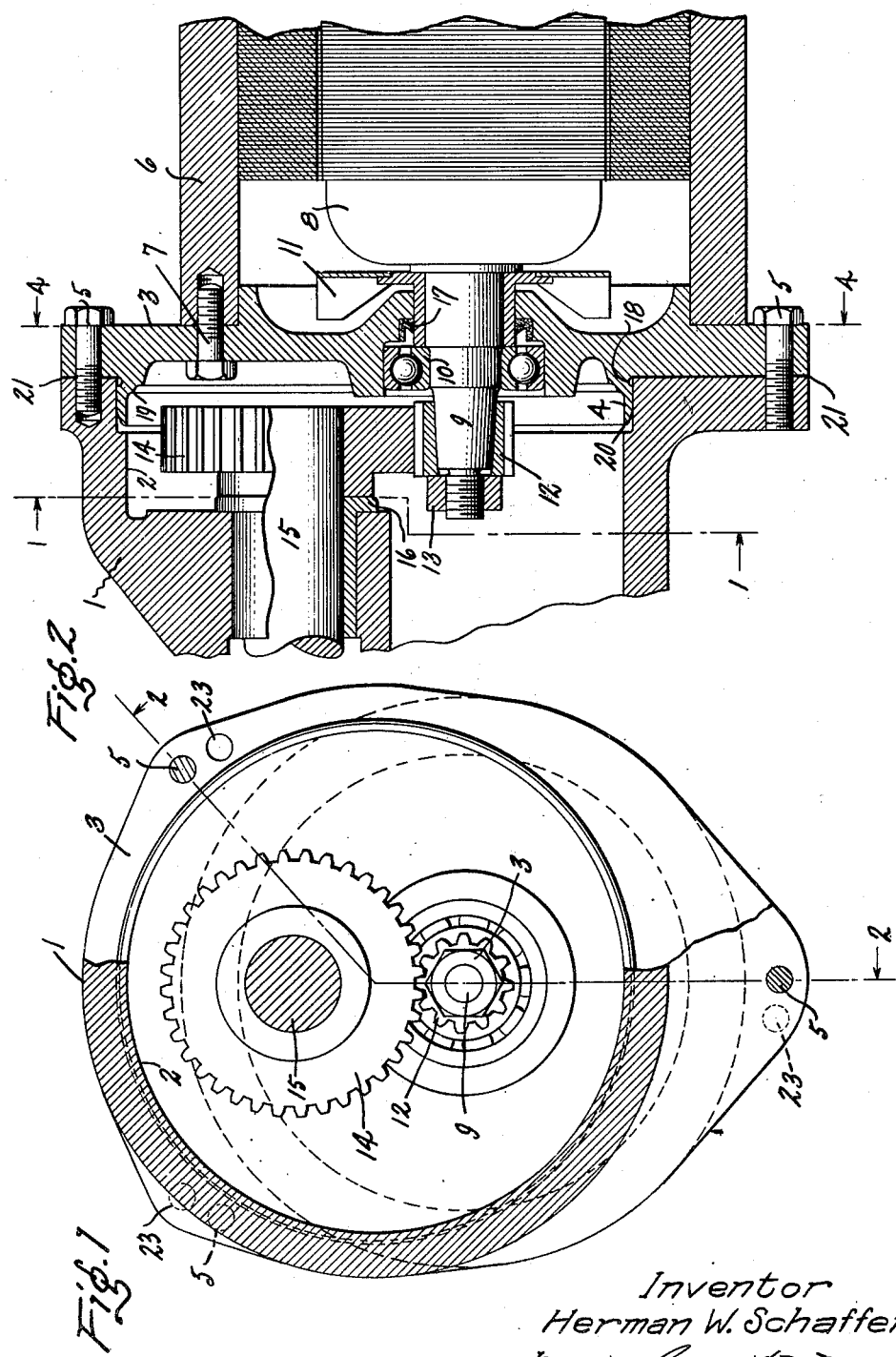

2,814,368

GEAR CASE SEAL

Herman W. Schaffer, Erie, Pa., assignor to General Electric Company, a corporation of New York Application July 31, 1953, Serial No. 371,478

7 Claims. (Cl. 189—36)

This invention relates to liquid tight seals and more particularly to an oil tight connection between a motor frame and a gear case.

It is well-known in this art to connect motor frames to gear casings with an oil tight gasket that is difficult to position and often complicated in its form. The primary difficulty of positioning these gaskets is generally in the aligning of the holes of the gasket with the bolts that hold the frame to the gear box. Many problems are raised with regard to positioning these gaskets so that an oil tight seal is obtained. For instance, should the gasket have a relatively long straight portion with no bolt holes, it is difficult to assure the proper positioning of this straight portion in the slot provided unless the slot has flanges for holding the gasket. The machining of such flanges is expensive and is usually not attempted, so that the tightness of the seal depends entirely upon the skill of the person assembling the mechanism, or the use of more bolts than are necessary to provide the mechanical strength required. Often the use of many bolts is impossible because of the structure of the mated members. This results in a seal that is likely to leak due to prolonged vibrations. Another disadvantage of the use of gaskets is that when it is necessary to assemble and disassemble the seal, the gasket must be replaced. Also it should be noted that if it is necessary to shim the seal for proper alignment of the gears, the shim must cover the entire gasket to insure a good seal. Such a shim is expensive for it must be machined on the surfaces in contact with the gaskets, and often a gasket must be positioned on both sides of the shim to assure a good seal.

Therefore, an object of my invention is to provide a seal between the gear case and the motor frame that is of relatively symmetrical and simple construction.

A further object is to provide an oil seal wherein a male member engages a female member through radial pressure to provide an expanding oil tight seal.

A further object is to provide a circular oil seal wherein the members of the seal are off center with regard to the machines mounting them so as to surround the gears with a seal that does not require a gasket.

A further object is to provide a gear case seal that has mating surfaces parallel to the line of mating motion so that it may be shimmed without causing the seal to be broken.

Briefly stated, in accordance with one aspect of this invention, the gear case is machined to provide a simple symmetrical female opening of a predetermined size. The frame of a motor is provided with a mating male flange member that is machined on its exterior surface to a slightly greater diameter than the female opening of the gear case. The male member is then inserted in the female portion of the gear case and positioned by a high interference press fit. Means are provided for pressing and holding the two members together, and an oil tight joint is thereby formed between the inner surface of the female member and the outer surface of the flange.

In practicing this invention in its broader aspects, it will occur to those skilled in the art that such a relationship between the mating members of such a seal could include a relationship where the frame of the motor carried the female portion and the gear housing carried the male portion, that an oil tight seal of this type may be used in other applications or that the mating members may take various forms and the principles about to be disclosed are equally applicable to these forms.

Further objects and advantages of this invention will become apparent and this invention will be better understood from the following description with reference to accompanying drawings, and the features of novelty which characterize this invention will be pointed out with particularity in the claims annexed to and forming part of this specification.

In the drawings, Fig. 1 is an end view, partially broken away, of the particular seal illustrating this invention;

Fig. 2 is a sectional view taken along the line 2—2 of Fig. 1;

Fig. 3 is a detail section on line 3—3 of Fig. 4 showing one of the holding bolts with the addition of a shim;

Fig. 4 illustrates the bolting arrangement for adjusting the bearing head;

Fig. 5 is a sectional view taken along the line 5—5 of Fig. 4.

Referring to the drawings, I have shown therein a preferred embodiment of my seal having a rigid gear case housing 1 provided with the female bore 2 and connected to a motor frame 3 having a relatively flexible flange member 4 by means shown as bolts 5. These members 2 and 4 are designed to be placed on the stationary members 1 and 3 so as to encompass the gearing used and are off center with regard to the members 1 and 3. It should be noted that only three bolts are needed in the structure shown, and as few as two could be used in some applications. A motor frame member 3 is fastened to the motor housing 6 by means shown as bolts 7. The motor is provided with armature 8 mounted on a shaft 9 which is journalled in a bearing 10 and has a fan 11 for circulating air 11. On the end of the shaft 9 is shown a pinion gear 12 secured to the shaft by lock nut 13. This pinion gear is so positioned on shaft 9 that it extends into the gear case and engages the gear 14 which is mounted on a shaft 15. The shaft 15 may be journalled in any suitable bearing, as for example the sleeve bearing 16. A bearing seal 17 is placed between the frame member 3 and the shaft 9 to prevent oil from getting into the motor housing 6.

The female opening 2 in the gear housing 1 is shown as circular in shape, and the radially flexible male member 4 is also shown as circular in shape, fitting into this female member only under a press fit. In other words, the outer surface of the flange 4 is machined to a slightly greater diameter than the inner surface of the female portion 2 and is of the same cylindrical shape so that an oil tight seal is provided around the entire periphery of the joint. The base of the flange 4 has a circumferential stress relief groove 18 that allows the use of shims without the danger of their falling into the machine or fouling the conventional corner radius. A thicker portion 19 is provided at the base of flange 4 on the inner surface thereof to the result that the member will carry the working load of such a connection without scarring the seal member 2 because of the flexibility of flange 4.

In assembling this preferred embodiment of my invention, the female member 2 is machined to some diameter, such as 6.000 inches, which will encompass the gears 12 and 14. The flange member 4 is machined to have an outer diameter that is slightly greater than the female member, such as 6.006 inches. It is also feasible to use this invention on large and rugged machines as long as flange 4 is flexible and has a thickened portion 19 that will carry the loads involved. In larger machines, it may be desirable to machine the outer side of the flange 4 to a slightly smaller diameter, or the portion opposed to the load carrying thickened portion 19 to a smaller diameter, so that a reasonable press fit may be used and the female member 2 will not be damaged by the relatively nonflexible portion of the flange. This relieved portion 18 is shown in the drawings, but could be in the female portions of the seal as a slight tapering chamfer, depending on the design and machining problems involved. It is easily seen that male member 4 cannot be fitted into female member 2 without a press fit causing the flange to be slightly deformed radially. As member 4 is pressed into member 2 the flange 4 is caused to bend and may be easily positioned by the slight acute chamfer as shown in Figs. 3 and 5 at 20. It is necessary that the mating surfaces be machined to a surface parallel to the line of mating motion and that the flange 4 be flexible to the extent that it can be forced into the cooperating member of the seal.

Figs. 3, 4 and 5 illustrate a bolt jacking arrangement to facilitate adjustment of the bearing head location by the application of a shim 21 between the members 1 and 3 without any interference of the usual curved corner that is used to relieve stress and simplify machining. On making this adjustment the three bolts 5 and their lockwashers 5a are removed from their regular position shown as 22 in Fig. 4 and positioned in new bolt holes as shown at 23 which are tapped in the member 3 but not in the member 1 as shown in Fig. 5. In this manner the flange 4 may be jacked out of its seat just enough to allow removal or addition of whatever shims are needed. The bolts 5 are then reassembled in the mounting holes 22 and drawn up tight against the shims 21 as shown in Fig. 3. This arrangement utilizes washer type shims shown as 21 and will not cause the members 1 or 3 to be warped by tightening up the mounting bolts 5, as might occur if shims were placed between the bolt holes. Shims may be necessary where accurate gear alignment is needed, as would be required if worm gearing were used. It is obvious that this type of shimming would be impossible if the usual compression gasket were used as a seal to prevent oil seepage between the surfaces 24 and 25 or if the mating members 2 and 4 were tapered and not cylindrical in shape. It should be noted that this gear case seal does not require special milling of the surfaces 24 or 25.

It will thus be understood that my invention provides an improved gear case seal that does not require a gasket on machining of gasket surfaces, that requires fewer bolts than are necessary with a gasket type seal, that may be assembled and disassembled many times without loss of effectiveness, and that may be shimmed to allow for proper alignment of the gear heads without disassembling the seal or draining the oil.

While I have shown and described the particular embodiment of this invention, further modifications and improvements will occur to those skilled in the art. I desire it to be understood, therefore, that this invention is not limited to the form shown, and I intend the appended claims to cover all modifications which do not depart from the spirit and scope of this invention.

What I claim as new and desire to secure by Letters Patent of the United States is:

1. A load carrying expanding oil seal for connecting a pair of stationary members that are subject to vibration and may require a shimming adjustment of said seal to determine the spacing of the members, comprising a rigid female member mounted on one of the stationary members having a bore surface machined to a predetermined size, said bore surface being machined parallel to the line of mating motion of the stationary members, a relatively flexible male member having a thicker load carrying portion at its base mounted on the other of said stationary members and machined to a slightly larger outer size than said bore, said male member having an acute chamfer in the leading surface to facilitate insertion in said bore and having its machined surface machined to provide a surface parallel to the line of mating motion to provide an oil-tight seal regardless of whether shims are used between said stationary members, said male member having a stress relief groove at its base around the entire periphery thereof, and means for forcing the male member into the female member to provide an oil-tight seal between said bore and said flange.

2. An expanding oil tight seal for connecting a pair of stationary members subject to longitudinal adjustment considerations, comprising a female member mounted on one of said stationary members having a bore of a predetermined inner diameter, an annular male member insertable in said female member and mounted on the other of said stationary members, said male member being slightly larger in diameter than said bore and having a configuration which will mate with and contact the entire circumference of said bore, each of said mating members having a cross sectional area capable of carrying the loads contemplated between said stationary members, one of said mating members being relatively flexible to allow a forced fit without permanent deformation of either of said members, each of said members having its mating surfaces machined to provide a surface parallel to the line of mating motion, and means for forcing said male member into said female member to provide an oil tight fit between said bore and said male member.

3. An expanding oil tight seal for connecting a pair of stationary members subject to longitudinal adjustment considerations, comprising a female member mounted on one of said stationary members having a bore of a predetermined inner diameter, an annular male member insertable in said female member and mounted on the other of said stationary members, said male member being slightly larger in diameter than said bore and having a configuration which will mate with and contact the entire circumference of said bore, each of said mating members having a cross-sectional area capable of carrying the loads contemplated between said stationary members, one of said mating members being relatively flexible to allow a forced fit without permanent deformation of either of said members, said one mating member having a stress relief groove machined therein adjacent to the base thereof, each of said members having its mating surfaces machined to provide a surface parallel to the line of mating motion, and means for forcing said male member into said female member to provide an oil tight fit between said bore and said male member.

4. An expanding oil tight seal for connecting a pair of rigidly connectable machines subject to longitudinal adjustment considerations, comprising a relatively rigid female member mounted on one of said machines having a bore of a predetermined inner diameter, a relatively flexible annular male member insertable in said female member and mounted on the other of said machines, said male member having an outer surface of slightly larger diameter than said bore and having an outer surface configuration which will provide an oil tight contact between said male member and said bore, each of said members having a cross-sectional area capable of carrying the loads contemplated between said machines, said outer surface and said bore being machined to provide surfaces parallel to the line of mating motion, means for forcing said male member into said female member, and means for jacking said male member from within said female member to allow changing of shims between said machines.

5. An expanding oil tight seal for connecting a pair of rigidly connectable machines subject to longitudinal adjustment considerations, comprising a relatively rigid female member mounted on one of said stationary machines having a bore provided with a surface of a predetermined inner diameter, a relatively flexible annular male member insertable in said female member and mounted on the other of said machines, said male member having an outer surface of slightly larger diameter than said bore and having an outer surface configuration which will provide circumferential contact between said member and said bore, said male member having a stress relief groove therein adjacent to said other machine, each of said members having a cross-sectional area capable of carrying the loads contemplated between said stationary machines, said outer surface and said bore being machined to provide surfaces parallel to the line of mating motion, one of said members having a chamfer at the leading edge of the mating surface to facilitate proper positioning of said surfaces, means for forcing said male member into said female member, and means for jacking said male member from within said female member to allow changing of shims between said stationary machines.

6. A load carrying expanding oil seal for connecting a pair of rigidly connectable members that may require a shimming adjustment of the seal to determine the spacing of the members, comprising a cavity in one of the members having a bore machined to provide a surface of a predetermined size, said bore surface being machined parallel to the line of mating motion of the members, an extension mounted on the other of the members, said extension having an acute chamfer in the leading edge to facilitate insertion in said bore and having its outer surface machined to provide a surface slightly larger than said bore and parallel to the line of mating motion to provide an oil-tight seal regardless of whether shims are used between the members, and means for forcing said extension into said cavity to provide an oil-tight seal between said bore and said outer surface.

7. A load carrying expanding oil seal for connecting a pair of rigidly connectable machines that may require a shimming adjustment of the seal to determine the longitudinal spacing of the machines, comprising a female member mounted on one of the machines having a bore machined to provide a surface of a predetermined size that is parallel to the line of mating motion of the machines, a male member mounted on the other of the machines and having its outer surface parallel to the line of mating motion and slightly larger than said bore to provide an oil-tight seal regardless of whether shims are used between the machines, one of said members being relatively flexible to allow a forced fit without permanent deformation of either of said members, means for forcing the male member into the female member, and means for jacking said male member from within said female member to allow the changing of shims between the machines.

References Cited in the file of this patent

UNITED STATES PATENTS

| | | |
|---|---|---|
| 2,037,962 | Brown | Apr. 21, 1936 |
| 2,064,679 | Munroe et al. | Dec. 15, 1936 |
| 2,492,041 | Heise | Dec. 20, 1949 |